US008302086B2

(12) United States Patent
Li et al.

(10) Patent No.: US 8,302,086 B2
(45) Date of Patent: Oct. 30, 2012

(54) SYSTEM AND METHOD FOR OVERFLOW DETECTION USING SYMBOLIC ANALYSIS (75) Inventors: Lian Li, Carindale (AU); Cristina N. Cifuentes, Forest Lake (AU); Nathan Robert Albert Keynes, Kuraby (AU)

(73) Assignee: Oracle America, Inc., Redwood City, CA (US)

( * ) Notice: Subject to any disclaimer, the term of this patent is extended or adjusted under 35 U.S.C. 154(b) by 509 days.

(21) Appl. No.: 12/642,729

(22) Filed: Dec. 18, 2009

(65) Prior Publication Data

US 2011/0154122 A1    Jun. 23, 2011

(51) Int. Cl.
*G06F 9/45* (2006.01)
(52) U.S. Cl. ........................................ 717/154; 717/151
(58) Field of Classification Search .......... 717/124–135, 717/151–161; 714/37, 38.1
See application file for complete search history.

(56) References Cited

U.S. PATENT DOCUMENTS

2009/0259989 A1* 10/2009 Cifuentes et al. ............. 717/110

OTHER PUBLICATIONS

Tu et al., "Gated SSA-Based Demand-Driven Symbolic Analysis for Parallelizing Compilers," 1995, ACM, p. 414-423.*
Blume et al., "Demand-Driven, Symbolic Range Propagation," 1996, Lecture Notes in Computer Science, vol. 1033/1996, p. 141-160.*
Babic, D. et al., "Calysto: scalable and precise extended static checking" ICSE '08: Proceedings of the 30th International Conference on Software Engineering, ACM, May 10, 2008, 10 pages.
Blanchet, B., et al., "A static analyzer for large safety-critical software" PLDI '03: Proceedings of the ACM SIGPLAN Conference on Programming Language Design and Implementation, ACM, Jun. 9, 2003, 12 pages.
Blume, W., et al., "Symbolic range propagation" IPPS '95: Proceedings of the 9th International Symposium on Parallel Processing, IEEE Computer Society, Apr. 1995, 7 pages.
Cadar, C., et al., "Klee: Unassisted and automatic generation of high-coverage tests for complex systems programs" OSDI '08: Proceedings of the 8th USENIX Symposium on Operating Systems Design and Implementation, pp. 209-224, USENIX Association, Oct. 2008.
Cousot, P., et al., "The ASTREE analyser" ESOP '05: Proceedings of the European Symposium on Programming, Lecture Notes in Computer Science, Springer, Apr. 2005, 10 pages.
Fahringer, T., et al., "Symbolic evaluation for parallelizing compilers" ICS '97: Proceedings of the 11th international conference on Supercomputing, ACM, Jul. 1997, 8 pages.
Ganapathy, V., et al., "Buffer overrun detection using linear programming and static analysis," CCS '03: Proceedings of the 10th ACM conference on Computer and communications security, ACM Press, Oct. 27, 2003, 10 pages.

(Continued)

*Primary Examiner* — Anna Deng
*Assistant Examiner* — Qing Chen
(74) *Attorney, Agent, or Firm* — Osha Liang LLP (57) ABSTRACT

A method for demand-driven symbolic analysis involves obtaining a section of code comprising an instruction from a source code file and determining a critical variable in the section of code and data dependencies related to the critical variable. The method further involves iteratively computing a symbolic value representing a range of values of the critical variable according to the data dependencies, determining a set of control predicates relevant to the critical variable at the instruction, refining the range of values according to the set of control predicates to generate a second range of values for the symbolic value, and reporting an error when the second range of values exceeds a predetermined value.

20 Claims, 5 Drawing Sheets

OTHER PUBLICATIONS

Hackett, B., et al., "Modular checking for buffer overflows in the large" ICSE '06: Proceeding of the 28th International Conference on Software Engineering, ACM, May 2006, 10 pages.

Haghighat, M. R., et al., "Symbolic analysis for parallelizing compilers" ACM Transactions on Programming Languages and Systems, Jul. 1996, 42 pages.

Le, W., et al., "Marple: a demand-driven path-sensitive buffer overflow detector" SIGSOFT '08/FSE-16: Proceedings of the 16th ACM SIGSOFT International Symposium on Foundations of Software Engineering, pp. 272-282, ACM, Nov. 9, 2008.

Rugina, R., et al., "Symbolic bounds analysis of pointers, array indices, and accessed memory regions" PLDI '00: Proceedings of the ACM SIGPLAN 2000 conference on Programming Language Design and Implementation, ACM, Aug. 2000, 14 pages.

Van Engelen, R. A. et al., "A unified framework for nonlinear dependence testing and symbolic analysis" ICS '04: Proceedings of the 18th annual International Conference on Supercomputing, pp. 106-115, ACM, Jun. 26, 2004.

Wagner, D., et al., "A first step towards automated detection of buffer overrun vulnerabilities" NDSSS '00: Network and Distributed System Security Symposium, Feb. 2000, 15 pages.

Xie, Y. et al., "Archer: using symbolic, path-sensitive analysis to detect memory access errors" ESEC/FSE-11: Proceedings of the 9th European Software Engineering Conference, ACM, Sep. 1, 2003, 10 pages.

Condit, J, et al, "CCured in the real world" PLDI '03: Proceedings of the ACM SIGPLAN 2003 conference on Programming Language Design and Implementation, pp. 232-244, ACM Press, Jun. 9, 2003.

Nagarakatte, S., et al., "SoftBound: highly compatible and complete spatial memory safety for C" PLDI -09: Proceedings of the 2009 SCM SIGPLAN conference on Programming Language Design and Implementation, ACM, Jun. 15, 2009, 14 pages.

Ruwase, O., et al., "A practical dynamic buffer overflow detector" NDSSS '04: Proceedings of the 11th Annual Network and Distributed System Security Symposium, Feb. 2004, 11 pages.

Oiwa, Y., "Implementation of the memory-safe full ANSI-C compiler" PLDI '09: Proceedings of the 2009 ACM SIGPLAN conference on Programming Language Design and Implementation, ACM, Jun. 15, 2009, 11 pages.

* cited by examiner

SYSTEM AND METHOD FOR OVERFLOW DETECTION USING SYMBOLIC ANALYSIS

BACKGROUND

Buffer overflows are a common cause of security vulnerabilities in systems code. Specifically, buffer overflow occurs when a process stores data in a buffer outside of the memory allocated for the process. The overflow can cause diverse errors including erratic program behavior, memory access errors, incorrect results, program crashes, and security breaches. A variety of techniques have been used to attempt to locate buffer overflows in code before they occur, including both dynamic and static techniques. One such technique is symbolic analysis.

Symbolic analysis was originally introduced more than 30 years ago, and has been applied in a variety of manners such as parallelization, optimization, and bug detection. The symbolic expressions resulting from symbolic analysis are typically so large and complex that external mathematical libraries are needed to solve them. As expected, these complex expressions cause symbolic analysis to be of limited use when dealing with large amounts of variables and/or large amounts of code, due to the time required to process the code. While various techniques have been developed to speed up the symbolic analysis processes, the efficiencies gained from the various techniques typically come at the cost of less accurate results.

SUMMARY

In general, in one aspect, the invention relates to a method for demand-driven symbolic analysis. The method involves obtaining, using a processor, a section of code including a first instruction from a source code file, determining, using the processor, a critical variable in the section of code, determining, using the processor, data dependencies related to the critical variable, iteratively computing, using the processor, a symbolic value representing a first range of values of the critical variable according to the data dependencies, determining, using the processor, a first set of control predicates relevant to the critical variable at the first instruction, refining, using the processor, the first range of values according to the first set of control predicates to generate a second range of values for the symbolic value, and reporting, using the processor, an error when the second range of values exceeds a predetermined value.

In general, in one aspect, the invention relates to a system for demand-driven symbolic analysis. The system includes a memory, and a processor, operatively connected to the memory and having functionality to execute instructions for obtaining a section of code, including a first instruction, from a source code file, determining a critical variable in the section of code, determining data dependencies related to the critical variable, iteratively computing a symbolic value representing a first range of values of the critical variable according to the data dependencies, determining a first set of control predicates relevant to the critical variable at the first instruction, where the first instruction represents a point within the section of code where the symbolic value will be computed, refining the first range of values according to the first set of control predicates to generate a second range of values for the symbolic value, and reporting an error when the second range of values exceeds a predetermined value.

In general, in one aspect, the invention relates to a computer readable storage medium storing instructions for demand-driven symbolic analysis. The instructions include functionality to obtain a section of code, including a first instruction, from a source code file, determine a critical variable in the section of code, determine data dependencies related to the critical variable, iteratively compute a symbolic value representing a first range of values of the critical variable according to the data dependencies, determine a first set of control predicates relevant to the critical variable at the first instruction, where the first instruction represents a point within the section of code where the symbolic value will be computed, refine the first range of values according to the first set of control predicates to generate a second range of values for the symbolic value, and report an error when the second range of values exceeds a predetermined value.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for overflow detection. Specifically, in one or more embodiments of the invention, the method analyzes code prior to execution of the code, and determines if an overflow may occur by using symbolic analysis. The symbolic analysis is performed by determining critical variables in the code, and then defining symbolic values to represent the critical variables. More specifically, both data dependencies and control dependencies are used to iteratively compute the symbolic values of the critical variables for different instructions of the code. Initially, for a given instruction, a symbolic value for a critical variable may first be computed by considering the data dependencies of the critical variable. The symbolic value may then be refined using the control dependencies that are relevant to the critical variable.

Throughout this specification the terms "overflow," "buffer overflow," and "exception" may be used interchangeably. Broadly speaking, a buffer overflow occurs when a process stores or reads data in a buffer outside of the memory assigned to the process. When a buffer overflow occurs, the data outside the memory assigned to the process may overwrite adjacent memory. However, this invention should not be limited to detecting buffer overflows. For example, integer overflows and any other variable overflow may also be detected in one or more embodiments of the invention. It will be apparent to one of ordinary skill in the art that the present invention may be used in a variety of techniques involving a boundary computation. In addition, the invention may be used for bug checking and other suitable purposes.

A symbolic value is a representation of the potential values of a program variable. In one or more embodiments of the invention, a symbolic value may represent different potential values for different instructions (i.e., the symbolic value may be [0, 5] at line 1, and [2, 3] at line 15). Typically, the symbolic value represents a range of values, and may depend on other symbolic values. An instruction is a point of execution in the program code. In other words, an instruction may correspond to a specific moment in time during execution of the program code. Because symbolic values are based on instructions, each instruction enables the symbolic value to represent the values of a critical variable at a specific moment in program execution. A critical variable may be the variable or variables to be analyzed during a symbolic analysis. It will be apparent to one of ordinary skill in the art that there are a variety of manners for determining which variables should be analyzed and, as such, the term critical variable should not be limited to any embodiment described herein.

A data dependency exists when the critical variable is dependent on an instruction preceding the defining instruction of the critical variable. More specifically, data dependencies may exist for each of the incoming operands of the instruction by which the critical variable is defined. It will be apparent to one of ordinary skill in the art that there are many types of data dependencies and, as such, the invention should not be limited to the above example.

A control dependency is an instruction (e.g., an if statement, a for loop, etc.) that affects the flow of the program with respect to the critical variable. Control dependencies may be directly or indirectly related to the critical variable. The term "linearly related" may be used throughout this application to describe a directly related control dependency. It will be apparent to one of ordinary skill in the art that there are many types of control dependencies, and as such, the invention should not be limited to the above examples.

Figure 1:
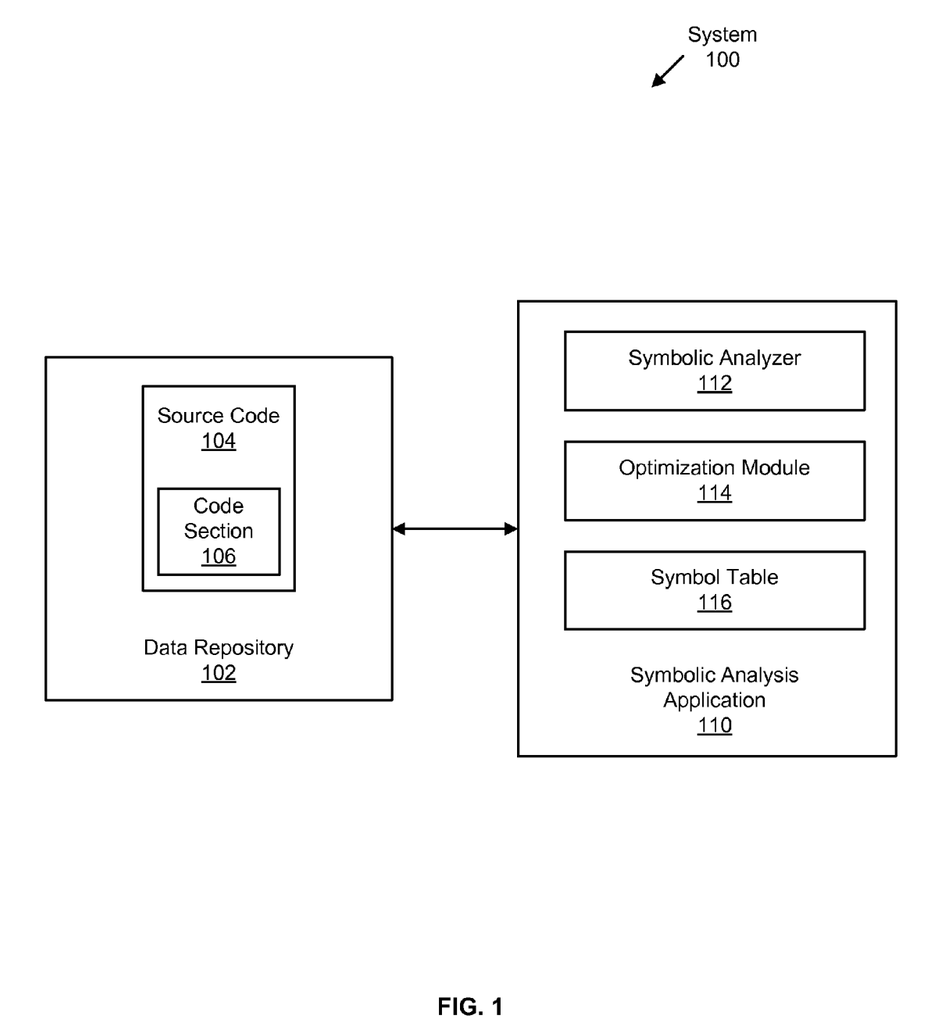
FIG. 1 shows a diagram of a system in accordance with one or more embodiments of the invention.

FIG. 1 shows a diagram of a system in accordance with one or more embodiments of the invention. As shown in FIG. 1, System (100) includes Data Repository (102), Source Code (104), Code Section (106), Symbolic Analysis Application (110), Symbolic Analyzer (112), Optimization Module (114), Symbol Table (116). Each of the aforementioned components of FIG. 1 is discussed below.

Data Repository (102) may be any device capable of storing data (e.g., computer, server, hard drive, memory, flash drive, etc). Data Repository (102) may store software applications, code files, or any other type of data. In one or more embodiments of the invention, Symbolic Analysis Application (110) may reside on the same device as Data Repository (102). Alternatively, Symbolic Analysis Application (110) may reside at a different location.

Source Code (104) may be stored in Data Repository (102). In one or more embodiments of the invention, Source Code (104) may be in a variety of programming languages (e.g., C, C++, Java, Pascal, Visual Basic, Python, etc), and may be for any type of program. Source Code (104) contains Code Section (106), which is the specific section that will be analyzed. In one or more embodiments of the invention, Code Section (106) may be all of Source Code (104). Alternatively, Code Section (106) may only be a few lines of code. One of ordinary skill in the art will recognize that any amount of code may be analyzed and, as such, the invention should not be limited to the above examples.

In one or more embodiments of the invention, Symbolic Analysis Application (110) includes Symbolic Analyzer (112), Optimization Module (114), and Symbol Table (116). Symbolic Analysis Application (110) may be, for example, a software application or module that includes instructions for performing symbolic analysis on program code. Symbolic analysis is the process of determining the potential range of values of a variable and, when the values exceed an amount, reporting an error.

Symbolic Analyzer (112) may be a software module configured to perform the symbolic analysis of variables in order to determine overflows. In one or more embodiments of the invention, Symbolic Analyzer (112) may use data dependencies and/or control dependencies to calculate symbolic values. Additionally, the Symbolic Analyzer (112) may determine which control predicates are linearly related to critical variables. A control predicate is a statement that controls the flow of a program. A control predicate is linearly related to the critical variable when the control predicate controls the value flow of the critical variable and is able to be represented as a linear function of the critical variable. It will be apparent to one of ordinary skill in the art that multiple control predicates may be linearly related to the critical variable and that control dependencies that are transformed into linearly related control dependencies may also be considered. Additionally, it will be apparent to one of ordinary skill in the art that by determining which control predicates are linearly related to the critical variable, only simple linear constraints will need to be solved, thereby greatly speeding up the process of symbolic analysis while maintaining a high degree of accuracy. In one or more embodiments of the invention, the Symbolic Analyzer (112) does not rely on external mathematical libraries to solve for symbolic values (i.e., the analysis is performed using embedded functionality of the Symbolic Analyzer (112)). In one or more embodiments of the invention, Symbolic Analyzer (112) may calculate an initial value of a symbolic value using the data dependencies. The initial value may be stored, for example, in Symbol Table (116). Symbolic Analyzer (112) may use the symbolic value stored in Symbol Table (116) to calculate the value of a symbolic value at an instruction on the fly by refining the stored value using control predicates. In one or more embodiments, the symbolic value may be refined using only the control predicates that are determined to be linearly related to the critical variable.

Optimization Module (114) may be a software module for implementing various optimizations for Symbolic Analysis Application (110). In one or more embodiments of the invention, optimizations adjust the speed or accuracy at which the symbolic analysis is performed, the type of variables analyzed, and/or any other aspect of symbolic analysis. Specifically, in one or more embodiments of the invention, Optimization Module (114) may be configured to identify more relevant dependencies, thereby increasing the accuracy of the analysis. For example, optimizations may include changes to solving for loop induction variables, variable analysis, path sensitive analysis, index variable analysis for global constant arrays, and other suitable optimizations. For example, loop induction variable analysis attempts to represent loop induction variables as functions to the loop iteration number, thereby allowing dependencies between induction variables and loop iteration numbers to be considered when computing symbolic ranges. In another example, path sensitive analysis allows for more precise calculation of symbolic ranges. One of ordinary skill in the art will recognize that many different optimizations may be implemented and, as such, the invention should not be limited to the above examples.

Symbol Table (116) may be used for storing symbolic values. For example, Symbol Table (116) may be any data structure suitable for storing symbolic values. In one or more embodiments of the invention, Symbol Table (116) may be used to store a value of a symbolic variable generated based on data dependencies. In one or more embodiments of the invention, Symbol Table (116) may not store any other data. Alternatively, Symbol Table (116) may also store a refined value of a symbolic variable generated based on control dependencies, or any intermediate value. Symbol Table (116) may be located on Data Repository (102) or at any other suitable location.

Figure 2:
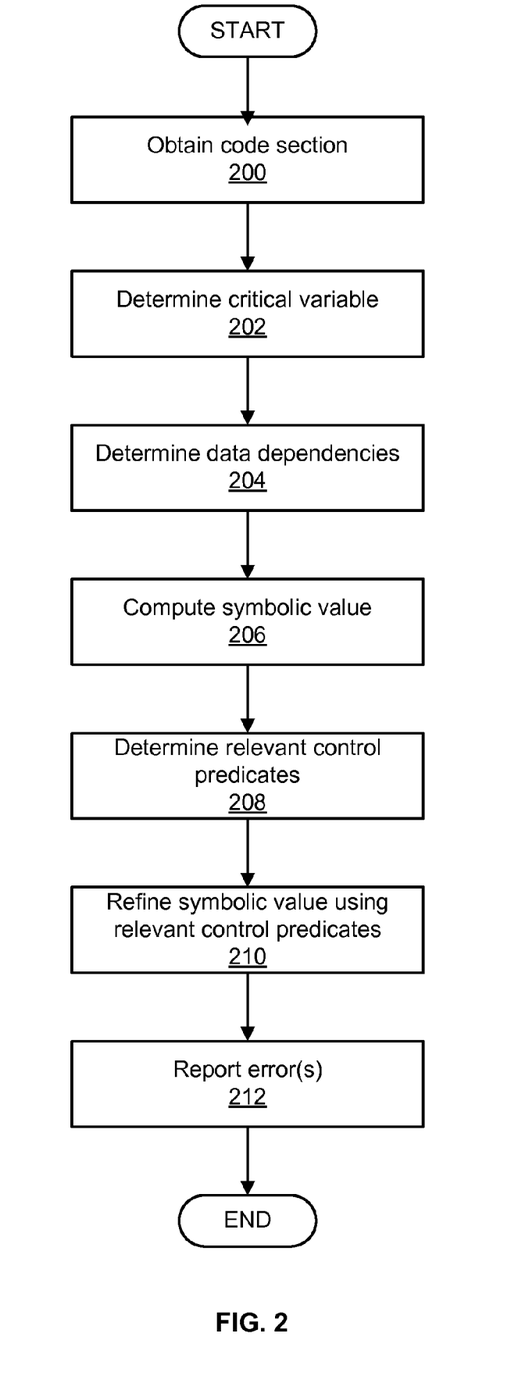
FIG. 2 shows a flowchart of a method in accordance with one or more embodiments of the invention.

FIG. 2 shows a flowchart of a method for overflow detection in accordance with one or more embodiments of the invention. The method of FIG. 2 may be implemented, for example, using the system of FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 200, a code section is obtained for analysis. The code section may be obtained from a variety of storage devices, including both local and remote storage devices. In one or more embodiments of the invention, the code section may be provided by a user. Alternatively, the code section may be automatically obtained during an analysis of source code, or any other suitable method may be used to obtain the code section. The code section may contain an instruction, where the instruction may be the point within the code section where a symbolic value is to be determined for a critical variable.

In Step 202, a critical variable is determined. A critical variable is a variable that may cause an overflow during execution of the code section. In one or more embodiments of the invention, a critical variable may include a buffer access. Alternatively, a critical variable may include any variable that may be checked for boundaries. It will be apparent to one of ordinary skill in the art that, based on configurations or optimizations used in the symbolic analysis software, many different kinds and types of variables may be determined to be critical variables and, as such, the invention should not be limited to the above examples. In addition, it will be apparent to one of ordinary skill in the art that there may be numerous critical variables in a single code section, and that these critical variables may or may not be related to one another. Further, it will also be apparent to one of ordinary skill in the art that by only analyzing variables that may potentially cause an overflow, some variables will be ignored, thereby increasing the speed at which the symbolic analysis may be performed.

In Step 204, data dependencies are determined for the critical variable. As described above, data dependencies may be all incoming operands of the instruction by which the critical variable is defined. It will be apparent to one of ordinary skill in the art that there are many kinds of data dependencies and, as such, the invention should not be limited to the above example. Additionally, it will be apparent to one of ordinary skill in the art that only data dependencies relevant to the critical variable may be considered, however, in various optimizations a broader range of data dependencies may be considered. Accordingly, the invention should not be limited to data dependencies related to the critical variable.

In Step 206, a symbolic value is iteratively computed for the critical variable based on the data dependencies. In one or more embodiments of the invention, the symbolic value is a range of potential values for the critical variable at an instruction (e.g., a specific line of code). Initially, the value range of the symbolic value may be undefined (e.g., $(-\infty, \infty)$, etc). Alternatively, the value range of the symbolic value may already be defined, based on the code section (e.g., $[0, \infty)$). In one or more embodiments of the invention, a symbolic value may have multiple definitions associated with it, each representing a different instruction (e.g., j0, j1, j2, etc). For example, a symbolic value definition may be associated with each instruction (i.e., location) where the critical variable is accessed or modified within the code section. Symbolic values may be dependent upon one or more of other symbolic values. Alternatively, the symbolic values may be independent, or a combination of both dependent and independent symbolic values.

In one or more embodiments of the invention, the range of values of the symbolic value is computed without using an external solver. In one or more embodiments of the invention, after computing the symbolic value based on the data dependencies, the symbolic value may be stored in a symbol table, as described in FIG. 1. It will be apparent to one of ordinary skill in the art that additional computations of the range of values for the symbolic value may be performed. By storing this computation in a symbol table, the symbolic value may be quickly accessed and refined on demand for any given instruction, based on the stored value.

An example of pseudo-code for computing the symbolic value of a critical variable according to data dependencies is shown in TABLE 1.

TABLE 1

```
procedure ComputeDefRange(V)
    if V has an entry in SymbolTable then return
    end if
    NewValSet = NewValSet ∪ V
    set SymbolTable[V] to [⊤, ⊥]
    for each operand Op_i used to compute V do
        ComputeUseRange(Op_i, D_V)
    end for
    Compute S_V
    SymbolTable[V] = S_V
    UpdateDefRange(V)
    NewValSet = NewValSet \ V
end procedure
procedure UpdateDefRange(V)
    for W ∈ NewValSet do
        if S_W is dependent on S_V then
            for each operand Op_i to compute S_W do
                ComputeUseRange(Op_i, D_W)
            end for
            Compute S_W
            SymbolTable[W] = SymbolTable[w] ∩ S_W
            if SymbolTable[W] has been updated then
                UpdateDefRange(W)
            end if
        end if
    end for
end procedure
```

In the example shown in Table 1, above, it is assumed that NewValSet and SymbolTable[ ] are initially empty. Also, V is used to represent a variable, and $D_V$ is used to represent the unique instruction where V is defined.

In Step 208, control predicates relevant to the critical variable are determined. In one or more embodiments of the invention, the control predicates may be determined in any manner well known in the art. In one or more embodiments of the invention, only directly related control predicates of the critical variable are considered to be relevant. In other embodiments, both directly and indirectly related control predicates of the critical variable are considered to be relevant. For example, any control predicate that controls the execution of an instruction operating on the critical variable and/or the value of the critical variable may be considered to be relevant. In another example, indirectly related control predicates may also be considered to be relevant. A control predicate may be indirectly related to the critical variable when the control predicate is loaded from a buffer with the index variable directly related to the critical variable, or when the critical variable is loaded from a buffer with the index variable directly related to the control predicate. In this case, indirect control predicates may be transformed into direct control predicates by examining the content of the buffer. Additionally, it will be apparent to one of ordinary skill in the art that there are a variety of manners of identifying control predicates for analysis and, as such, the invention should not be limited to the above examples.

In Step 210, the symbolic value is refined using the relevant control predicates. As described above, the relevant control predicates may be directly or indirectly related to the critical variable. In one or more embodiments of the invention, the symbolic value is retrieved from a symbol table. In another embodiment, the symbolic value may be computed or retrieved from a different location. The symbolic value may be refined by updating the symbolic value to represent the potential values of the critical variable at a particular instruction point using the relevant control predicates. In one or more embodiments of the invention, the step of refining may be performed iteratively using the relevant control predicates when there is a cyclic dependency. An example of pseudo-code for refining the range of a symbolic value is shown in TABLE 2.

TABLE 2

```
procedure RefineDefRange(V, P)
    S_{V,P} = SymbolTable[V]
    Let predSet be the set of predicates that controls both the
        execution of P and the value of V
    for every pred=(Op_1~Op_2) in predset do
        ComputeUseRange(Op2, pred)
        Refine S_{V,P}
    end for
    return S_{V,P}
end procedure
```

In the example shown above in Table 2, V is again used to represent a variable, while $S_{V,P}$ is used to represent the symbolic range of variable V at instruction P.

Finally, in Step 212, errors are reported. In one or more embodiments of the invention, an error may be a buffer overflow. Alternatively, the error may be an integer overflow or other error. The error may be reported with varying levels of detail. For example, the error may include information specifying the exact line of code where the error occurred, the particular type of error, and any other relevant information. The error may be reported in any manner including but not limited to: a display, printout, text file, audio file, or any other suitable means.

Figure 3A:
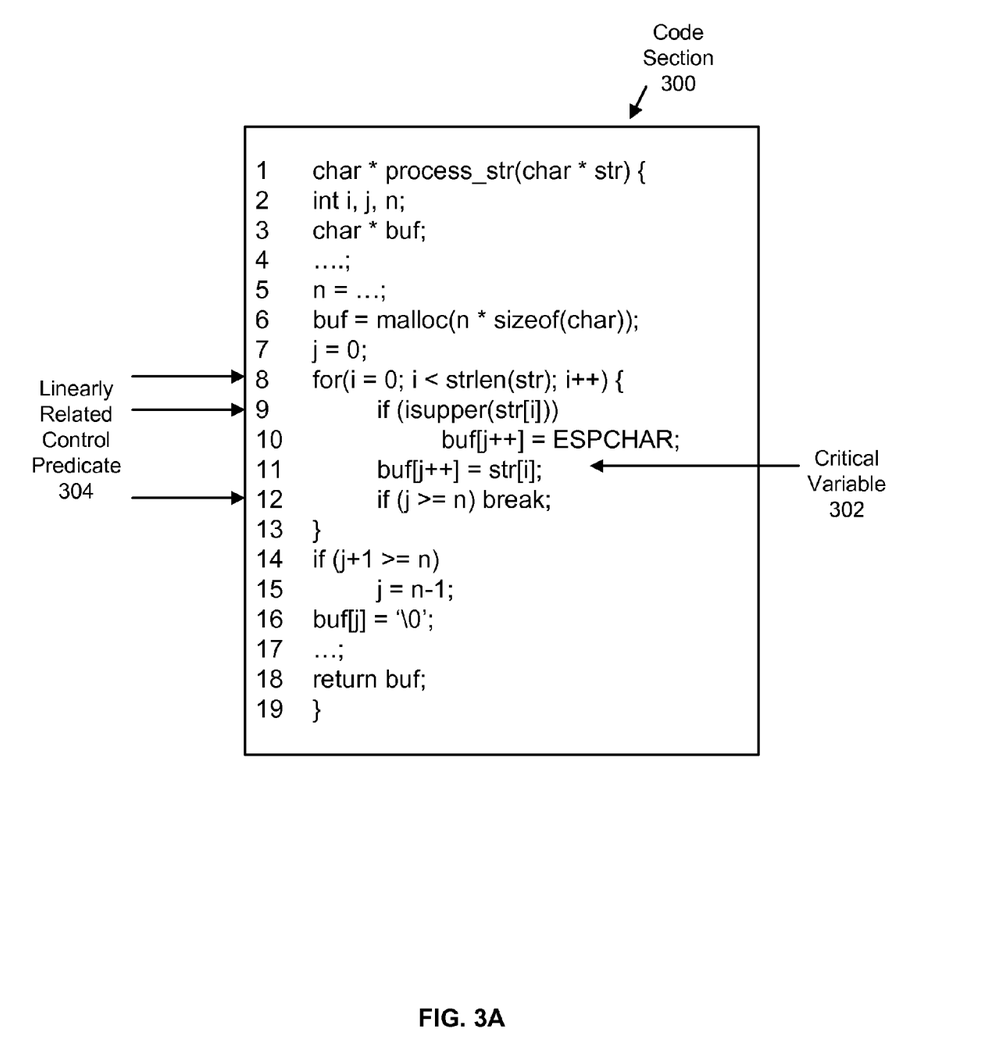
FIGS. 3A-B show an example in accordance with one or more embodiments of the invention.
Figure 3B:
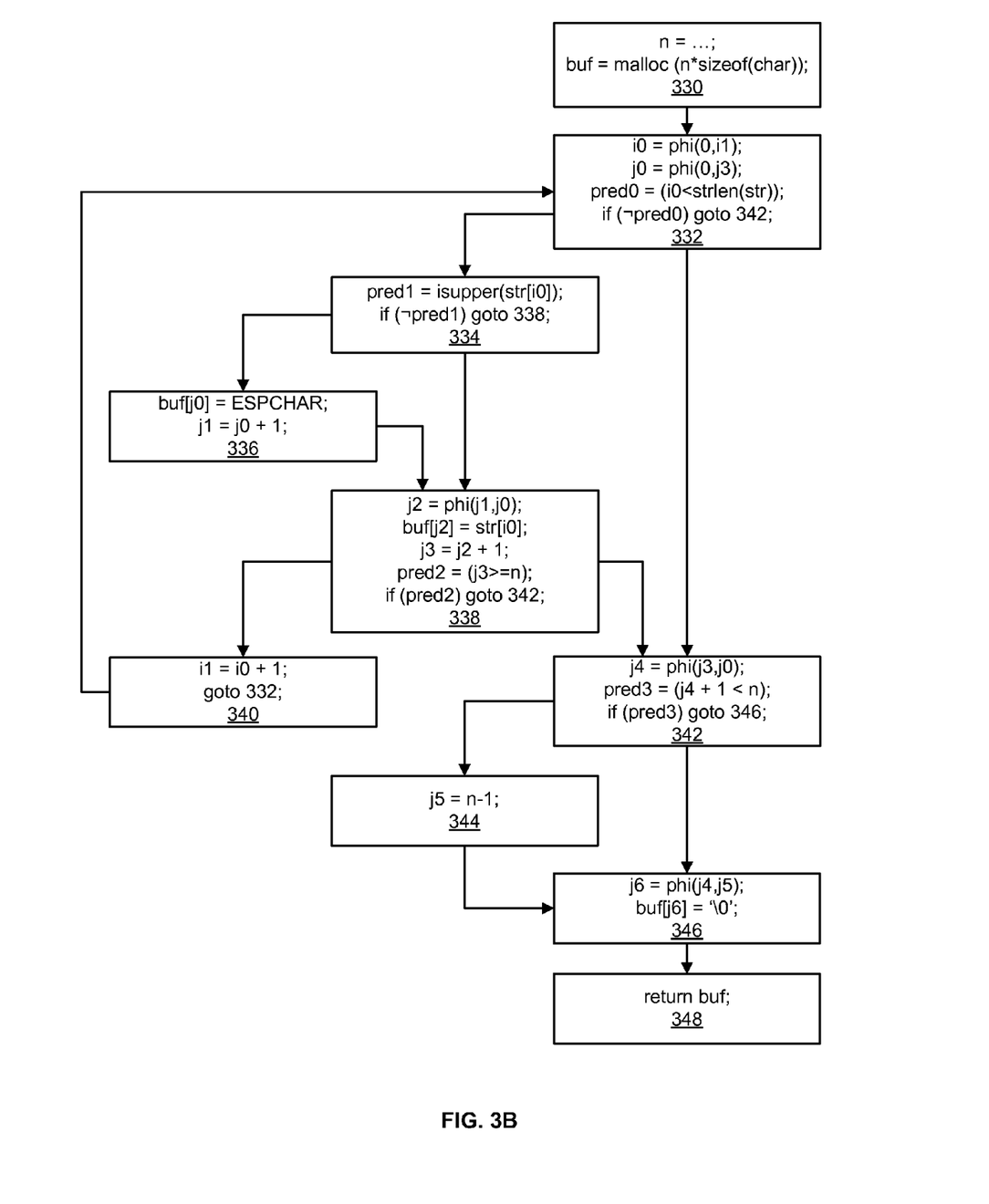

FIG. 3A-B show examples in accordance with one or more embodiments of the invention. Specifically, the example in FIG. 3A shows a code section, and FIG. 3B shows the relevant blocks of the code section from FIG. 3A in intermediate representation. The example of FIGS. 3A-B has been simplified to aid in the understanding of the invention and, as such, the invention should not be limited to this example.

FIG. 3A shows Code Section (300), which contains Critical Variable (302) and Linearly Related Control Predicate (304). For the purposes of this example, Code Section (300) contains code written in the C programming language, but the invention is not limited to the C programming language, and may be used to analyze code from any programming language. FIG. 3A also shows that the Critical Variable (302) is the integer j at line 11. In one or more embodiments of the invention, depending on the optimizations used, other variables may also be determined to be critical variables. However, for ease of explanation, this example will focus on the integer j. In one or more embodiments of the invention, a symbolic value may be defined at each point where j is modified, accessed, or is the join point of two or more different value paths. It will be apparent to one of ordinary skill in the art that this is not an exhaustive list of all the points where a critical variable may be assigned a symbolic value. FIG. 3A also shows Linearly Related Control Predicate (304). Specifically, Linearly Related Control Predicate (304) shows the three instructions (i.e., line 8, 9, and 12) where a control predicate affects the flow of the integer j. It will be apparent to one of ordinary skill in the art that program controls besides if and for may be a linearly related control predicate.

In general, when executed, the code in Code Section (300) takes an input string (i.e., (char*str), at line 1) and adds a letter (i.e., ESPCHAR, at line 10) in front of every capital letter of the input string. Specifically, the addition of the letter is accomplished by first creating a new string buf of size n at lines 5-6. Then, in the for loop (i.e., lines 8-13) each character of the input string is processed and copied to buf. If the character is an uppercase letter, then a new letter (i.e., ESPCHAR) is inserted into buf before the uppercase letter is copied to buf. Finally, in lines 14-16, a string terminator is appended to the end of buf.

FIG. 3B shows the Code Section (300) of FIG. 3A in intermediate representation. To aid in understanding of the invention, only the portions of Code Section (300) relevant to integer j are displayed in intermediate representation. In one or more embodiments of the invention, one or more of the boxes shown in FIG. 3B may be omitted, repeated, and/or performed in a different order than the order shown in FIG. 3B. Accordingly, the scope of the invention should not be considered limited to the specific arrangement shown in FIG. 3B. The elements of FIG. 3B will first be explained, and an example symbolic analysis, performed on the elements of FIG. 3A-B, will be explained.

Initially, the integer n is defined and buf is assigned an amount of memory (box 330). In box 332, symbolic values are defined for integer i and integer j, i0 and j0, respectively. Both i0 and j0 are defined as phi nodes. A phi node is a definition of a symbolic value that represents the join point of two distinct paths that the value of the variable could take. In this case, i0 is defined as phi(0,i1), while j0 is defined as phi(0,j3). In this case, the phi nodes are used to represent the different values that i and j may have during the execution of the for loop (e.g., starts at 0 but after each loop it is incremented by 1, where the for loop may run multiple times). Further, in box 332, pred0 is defined as i0<strlen(str). In this case, pred0 is a linearly related control predicate (i.e., the for loop on line 8) and, when true, the flow of execution proceeds to box 334. When false, the flow of execution proceeds to box 342.

In box 334, pred1 is defined as isupper(str[i0]) (i.e., pred1 represents the if statement on line 9). If pred1 is true, the flow of execution proceeds to box 336. If pred1 is false, the flow of execution proceeds to box 338. In box 336, ESPCHAR is added to buf[j0], and j1 is defined as j0+1. j1 is a new definition of the symbolic value of j. A new definition of the symbolic value of j is needed because box 336 represents a distinct path that the value of j may take (i.e., the if statement of line 9). Next, the flow of execution proceeds to box 338.

In box 338, a new definition of the symbolic value of j, j2, is defined as phi(j1,j0), and the buffer has the character at str[i0] added to it. This phi node represents the join point of the distinct paths that the value of j may take to reach this instruction (i.e., whether or not the if statement applied). Additionally, j3 is defined as j2+1, and is then used in pred2, which is defined as (j3>=n). When pred2 is false, the flow of execution proceeds to box 340, and when it is true, the flow of execution proceeds to box 342. In box 340, a new definition of the symbolic value of i, i1, is defined as i0+1, and the flow of execution proceeds back to box 332.

In box 342, a new definition of the symbolic value of j, j4, is defined as phi(j3, j0), and j4 is then used to define pred3 as (j4+1<n). When pred3 is true, the flow of execution proceeds to box 344, when it is false, the flow of execution proceeds to box 346. In box 344, j5 is defined as n−1, after which the flow of execution proceeds to box 346. In box 346, j6 is defined as phi(j4,j5) and is then used to add the string terminator to buf. Finally, in box 348, buf is returned.

Having described the elements of FIG. 3B, an example symbolic analysis will now be described. Initially, the symbolic range of j0 is computed. By default, a symbolic range is initialized to (−∞,∞). In one or more embodiments of the invention, an optimization may be used to initialized j0 to [0, ∞). This may be done because j0 is a loop induction variable with an initial value of 0, where the loop has a positive stride. However, the symbolic range of j0 depends on the symbolic range of j3, which depends on the symbolic ranges of j2 and j1, forming a cyclic dependency. Because of this, the symbolic ranges of j0, j1, j2, and j3 will be iteratively computed. In the first iteration, based on j0=[0, ∞), j1 and j2 are equal to [1, ∞), while j3 is equal to [2, ∞).

Next, the symbolic range of j0 needs to be computed based on the symbolic range of j3. If pred2, defined as j3>=n in box 338, is false, the execution of the program flows back to the phi node where j0 is defined, and accordingly it is known that the definition of j3=[2, n−1] at this instruction. In this case, the symbolic range of j0 is [0, n−1]. At this stage, the symbolic ranges of j1, j2, and j3 should be updated based on the new symbolic range of j0. Updating the symbolic ranges of j0, j1, j2, j3 may repeat as many times as is needed to reach a fixed point. One of ordinary skill in the art will recognize that there are a variety of manners for determining when to stop iteratively computing the symbolic ranges of cyclically related variables. At the end of the iterative computations, the value for j0 is [0, n−1], the value for j1 and j2 is [1, n], and the value for j3 is [2, n+1]. Thus, a buffer overflow is detected in line 11, because the maximum value for j2 (i.e., n) is greater than the size of buf.

Additionally, another buffer access at line 16 should be examined. Without path-sensitive analysis, a buffer overflow will be detected at line 16, because j6 is based on phi(j4, j5), and the symbolic range of j4 is [0, n+1]. Thus, the value of j6 may exceed the size of buf. However, with path-sensitive analysis, it can be determined that the value of j4 may only reach the point where j6 is defined when j4 is less than n−1 (i.e., j4 does not go through the if statement at line 14-15). In this case, the range of j6 will be [0, n−1], which is within the bounds of buf; thus, no false buffer overflow will be reported.

In one or more embodiments of the invention, in the above described example, each definition of a symbolic value may be stored in a symbol table. Alternatively, the first definition may be stored in the symbol table, and the other definitions may be generated based off of the first definition. The symbol table may be updated each time a new value is calculated for a definition of a symbolic value, such that future calculations will always have the most recent calculation available to them. It will be apparent to one of ordinary skill in the art that by saving the value range of each definition of a symbolic value in a symbol table, the speed at which symbolic analysis may be performed is greatly increased.

After reading this specification, it will be apparent to one of ordinary skill in the art that this invention was created with the dual purposes of being efficient and accurate. More specifically, overflow detection as described above may be configured to be practical for analyzing vast amounts of source code rapidly. For example, overflow detection as described above may be executed for 8.6 million lines of code in 11 minutes while detecting hundreds of buffer overflows with a false positive rate of 10% using an INTEL E8600 dual core 3.33 Gigahertz processor with 8 Gigabytes of memory. Intel is a registered trademark of the Intel Corporation of Santa Clara, Calif. It will be apparent to one of ordinary skill in the art that speed and false positive rates may vary greatly depending on the code analyzed and the optimizations used and, as such, the invention should not be limited to a particular speed, accuracy, or configuration. Additionally, it will be apparent to one of ordinary skill in the art that there are many optimizations that may alter the performance of the invention in a desired way and still be within the scope of the present invention.

Figure 4:
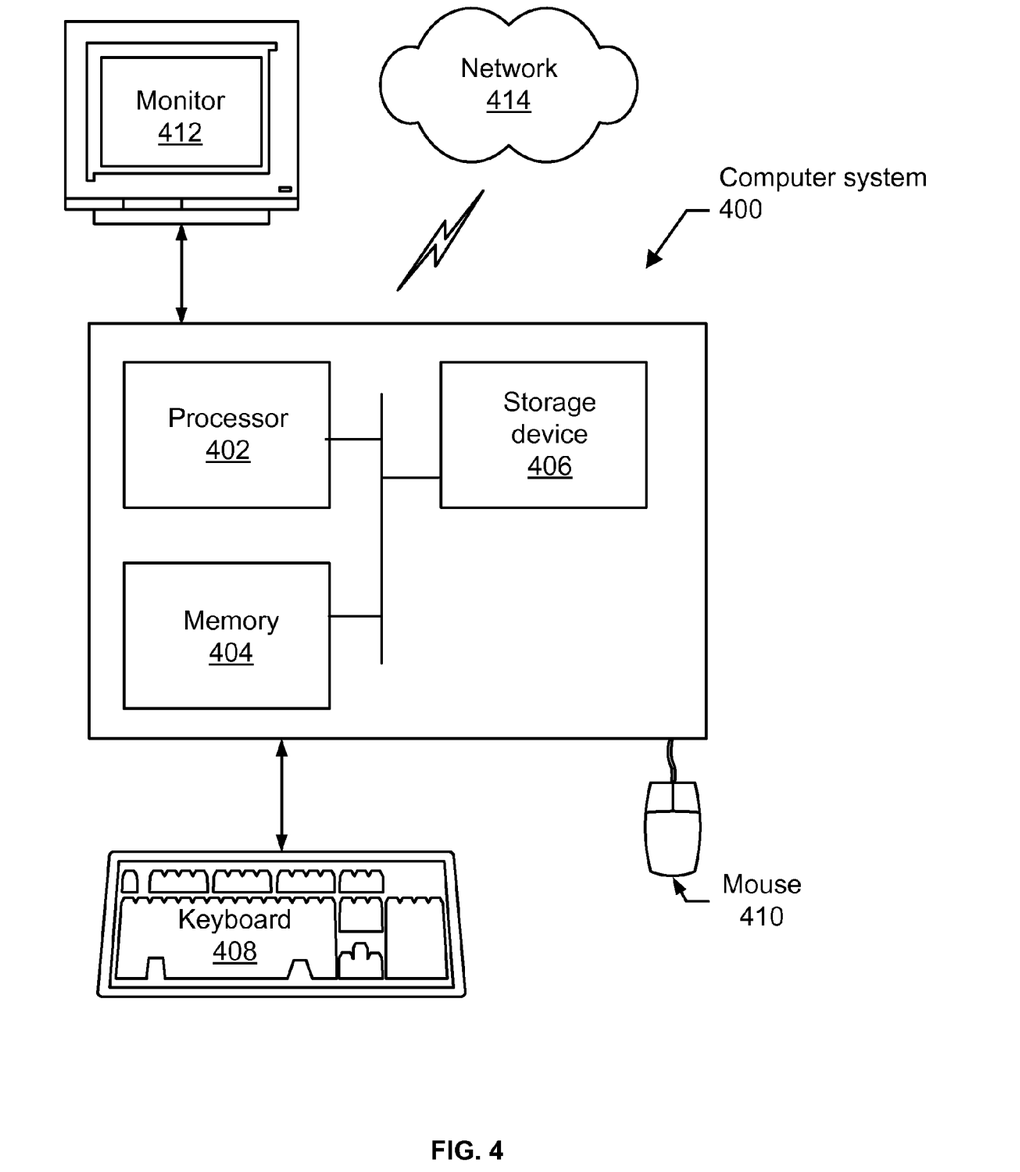
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (400) includes at least the minimal processing, input, and/or output means necessary to particularly practice embodiments of the invention.

Further, those skilled in the art will appreciate that one or more elements of the aforementioned computer system (400) may be located at a remote location and connected to the other elements over a network (414). Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for demand-driven symbolic analysis for detecting overflow comprising:
   obtaining, using a processor, a section of code comprising a first instruction from a source code file;
   determining, using the processor, a critical variable in the section of code;
   determining, using the processor, data dependencies related to the critical variable;
   iteratively computing, using the processor, a symbolic value representing a first range of potential values of the critical variable at the first instruction according to the data dependencies, wherein the first instruction represents a point within the section of code where the symbolic value will be computed;

determining, using the processor, a first set of control predicates relevant to the critical variable at the first instruction;

refining, using the processor, the first range of potential values according to the first set of control predicates to generate a second range of potential values for the symbolic value; and reporting, using the processor, an error when the second range of potential values exceeds a predetermined value.

2. The method of claim 1, wherein iteratively computing the symbolic value comprises:

setting the symbolic value to an initial value; and computing the symbolic value based on each operand defining the critical variable to obtain the first range of potential values.

3. The method of claim 2, further comprising:

updating a plurality of symbolic ranges dependent on the symbolic value in response to computing the first range of potential values.

4. The method of claim 2, further comprising:

storing the symbolic value in response to computing the first range of potential values.

5. The method of claim 1, wherein the refining of the first range of potential values is path-sensitive.

6. The method of claim 1, wherein the refining of the first range of potential values continues until a fixed point is reached.

7. The method of claim 1, wherein the error comprises an integer overflow.

8. A system for demand-driven symbolic analysis for detecting overflow comprising:

a memory; and a processor, operatively connected to the memory and having functionality to execute instructions for:

obtaining a section of code, comprising a first instruction, from a source code file;

determining a critical variable in the section of code;

determining data dependencies related to the critical variable;

iteratively computing a symbolic value representing a first range of potential values of the critical variable at the first instruction according to the data dependencies, wherein the first instruction represents a point within the section of code where the symbolic value will be computed;

determining a first set of control predicates relevant to the critical variable at the first instruction;

refining the first range of potential values according to the first set of control predicates to generate a second range of potential values for the symbolic value; and reporting an error when the second range of potential values exceeds a predetermined value.

9. The system of claim 8, wherein iteratively computing the symbolic value comprises:

setting the symbolic value to an initial value; and computing the symbolic value based on each operand defining the critical variable to obtain the first range of potential values.

10. The system of claim 9, further comprising functionality to execute instructions for:

updating a plurality of symbolic ranges dependent on the symbolic value in response to computing the first range of potential values.

11. The system of claim 9, further comprising functionality to execute instructions for:

storing the symbolic value in response to computing the first range of potential values.

12. The system of claim 8, wherein the refining of the first range of potential values is path-sensitive.

13. The system of claim 8, wherein the refining of the first range of potential values continues until a fixed point is reached.

14. The system of claim 8, wherein the error comprises an integer overflow.

15. A non-transitory computer readable storage medium storing instructions for demand-driven symbolic analysis for detecting overflow, the instructions with functionality to:

obtain a section of code, comprising a first instruction, from a source code file;

determine a critical variable in the section of code;

determine data dependencies related to the critical variable;

iteratively compute a symbolic value representing a first range of potential values of the critical variable at the first instruction according to the data dependencies, wherein the first instruction represents a point within the section of code where the symbolic value will be computed;

determine a first set of control predicates relevant to the critical variable at the first instruction;

refine the first range of potential values according to the first set of control predicates to generate a second range of potential values for the symbolic value; and report an error when the second range of potential values exceeds a predetermined value.

16. The non-transitory computer readable storage medium of claim 15, wherein iteratively computing the symbolic value comprises:

setting the symbolic value to an initial value; and computing the symbolic value based on each operand defining the critical variable to obtain the first range of potential values.

17. The non-transitory computer readable storage medium of claim 16, the instructions further comprising functionality to:

update a plurality of symbolic ranges dependent on the symbolic value in response to computing the first range of potential values.

18. The non-transitory computer readable storage medium of claim 16, the instructions further comprising functionality to:

store the symbolic value in response to computing the first range of potential values.

19. The non-transitory computer readable storage medium of claim 15, wherein the refining of the first range of potential values is path-sensitive.

20. The non-transitory computer readable storage medium of claim 15, wherein the refining of the first range of potential values continues until a fixed point is reached.

* * * * *